(12) United States Patent
Osawa

(10) Patent No.: US 8,382,316 B2
(45) Date of Patent: Feb. 26, 2013

(54) LED LAMP

(75) Inventor: Hideharu Osawa, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 153 days.

(21) Appl. No.: 12/991,865

(22) PCT Filed: May 28, 2009

(86) PCT No.: PCT/JP2009/059753
§ 371 (c)(1),
(2), (4) Date: Nov. 9, 2010

(87) PCT Pub. No.: WO2009/145248
PCT Pub. Date: Dec. 3, 2009

(65) Prior Publication Data
US 2011/0058365 A1    Mar. 10, 2011

(30) Foreign Application Priority Data

May 29, 2008  (JP) ................. 2008-140321

(51) Int. Cl.
*F21V 23/02* (2006.01)

(52) U.S. Cl. ............... 362/221; 362/217.1; 362/217.13; 362/219; 362/227; 362/800

(58) Field of Classification Search ............... 362/217.1, 362/217.12–217.13, 219, 227, 249.02, 800, 362/221
See application file for complete search history.

(56) References Cited

FOREIGN PATENT DOCUMENTS

| JP | U-H06-54103 | 7/1994 |
|---|---|---|
| JP | 2006-12860 | 1/2006 |

*Primary Examiner* — Meghan Dunwiddie
(74) *Attorney, Agent, or Firm* — Hamre, Schumann, Mueller & Larson, P.C.

(57) ABSTRACT

An LED lamp A1 includes at least one elongated LED unit 1 including a plurality of light emitting diodes 13, and bases 2 and 3 configured to be attached to the ends of the LED unit 1 in the longitudinal direction to receive power from outside. The lamp is configured to allow a plurality of LED units 1 to be serially connected. Such configuration contributes to reducing the manufacturing cost and facilitating the management of the products, with respect to a plurality of types of products of different lengths.

3 Claims, 5 Drawing Sheets

– 1 –
LED LAMP

TECHNICAL FIELD

The present invention relates to an LED lamp that employs an LED as a light source, and is suitable for use as a substitute for a fluorescent lamp.

BACKGROUND ART

FIG. 5 is a sectional view showing an example of a conventional LED lamp (see, for example, Patent Document 1). The LED lamp X shown in the figure includes an elongated rectangular-shaped substrate 91, a plurality of LEDs 92 mounted on the substrate 91, a tube 93 that accommodates the substrate 91, a terminal 94, and a circuit 95 for turning on the LEDs 92. On the substrate 91, a wiring (not shown) is provided that connects the plurality of LEDs 92 and the terminal 94. The LED lamp X is configured to turn on the plurality of LEDs 92 upon fitting the terminal 94 to a socket of a general-purpose fluorescent illumination instrument. Since LEDs 92 have lower power consumption and a longer life, to use the LED lamp X as a substitute for a fluorescent lamp is expected to provide advantage in cost and environment.

Herein, the general-purpose fluorescent illumination instrument refers to an illumination instrument mainly used for general interior illumination, more specifically to an illumination instrument that utilizes, for example in Japan, the commercial power supply of 100 V, and is compatible with a straight-tube fluorescent lamp according to JIS C7617 or a circular fluorescent lamp according to JIS C7618.

In the case of a straight-tube fluorescent lamp for use with a general-purpose fluorescent illumination instrument, FL 20W lamps, which have a shorter tube length (580 mm), and FL40W lamps, which have a longer tube length (1198 mm), for example, are specified to use the same type of base in common.

In the case of the conventional LED lamp X, however, such two types of lamps having different lengths are manufactured as completely different products, with difference in length of the substrate 91 as well as in the number of LEDs 92 mounted on the substrate 91. This considerably raises the manufacturing cost, and complicates the management of the products.
Patent Document 1: JP-U-H06-54103

DISCLOSURE OF THE INVENTION

Problems to be Solved by the Invention

The present invention has been conceived under the foregoing circumstances, and it is an object of the present invention to provide an LED lamp that enables reducing the manufacturing cost and facilitating management of products, with respect to a plurality of types of different tube lengths.

Means for Solving the Problem

To achieve the foregoing object, the present invention takes the following technical measures.

The present invention provides an LED lamp comprising at least one elongated LED unit including a plurality of light emitting diodes, and a first and a second bases for receiving power from outside that are configured to be attached to ends of the LED unit in the longitudinal direction. The LED unit includes a coupler for allowing serial connection of a plurality of the LED units.

In a preferred embodiment of the present invention, the LED unit includes a first wiring for serially connecting the light emitting diodes, and a second and a third wirings extending in the longitudinal direction. Each of the first and the second bases includes an external connection terminal for connection to an AC power supply, a first through a third electrodes that can be electrically connected to the first through the third wirings, respectively, and an AC/DC converter that converts AC to DC, provided between the electrodes and the external connection terminal. The first and the second electrodes are anodes while the third electrode is a cathode in the first base. The first and the second electrodes are cathodes while the third electrode is an anode in the second base. Ends of the first wiring are electrically connected to the first electrode of the first base and the first electrode of the second base. Ends of the second wiring are electrically connected to the second electrode of the first base and the third electrode of the second base. Ends of the third wiring are electrically connected to the third electrode of the first base and the second electrode of the second base.

In a preferred embodiment of the present invention, the LED unit includes a cylindrical cover surrounding the plurality of light emitting diodes and is of a straight tube shape as a whole.

In a preferred embodiment of the present invention, the LED unit includes a substrate on which the plurality of light emitting diodes is mounted, and the wirings are provided on the substrate.

Other features and advantages of the present invention will become more apparent through the detailed description given below referring to the accompanying drawings.

BEST MODE FOR CARRYING OUT THE INVENTION

Preferred embodiments of the present invention are described below with reference to the drawings.

Figure 1:
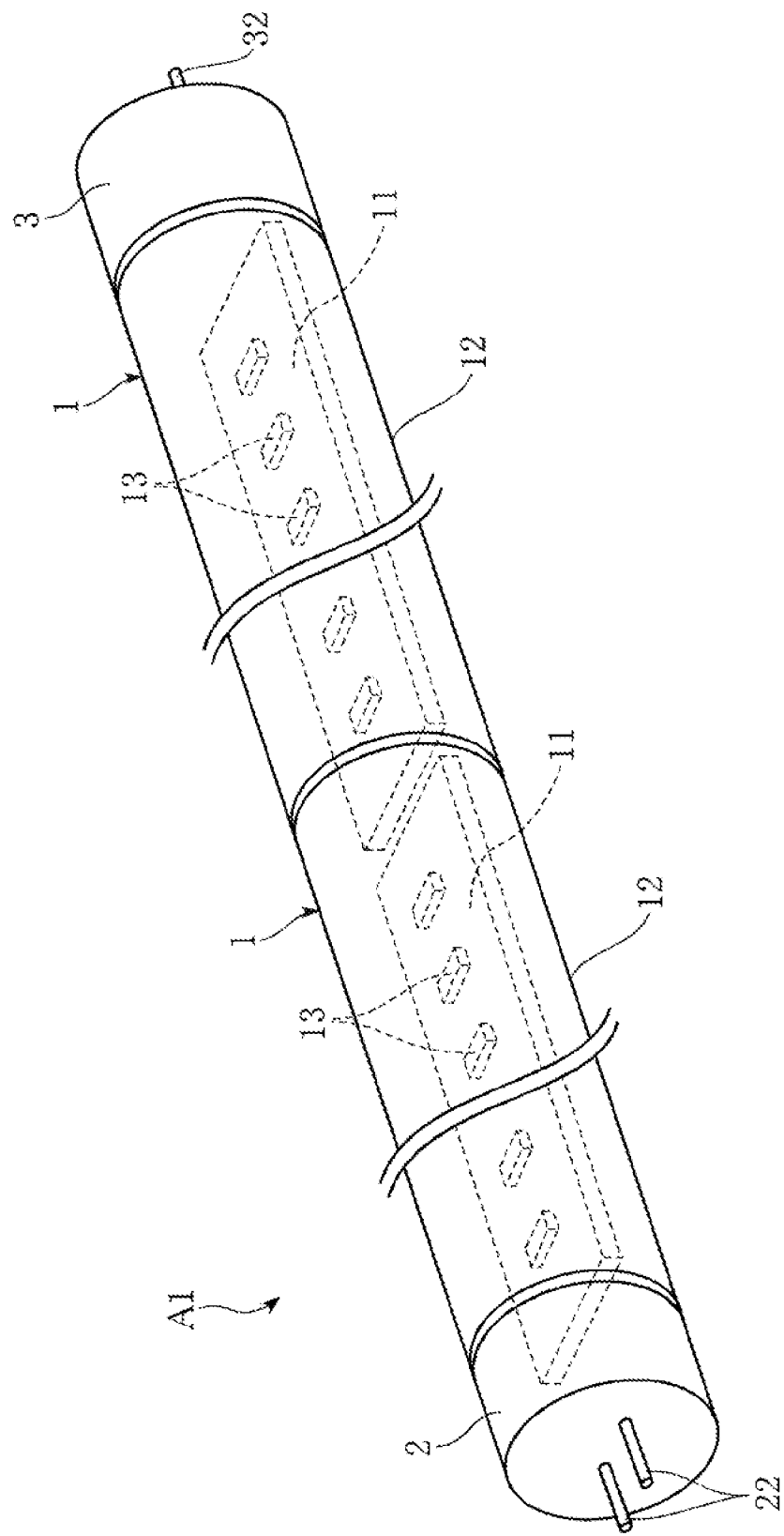
FIG. 1 is a perspective view showing an example of an LED lamp according to the present invention.
Figure 2:
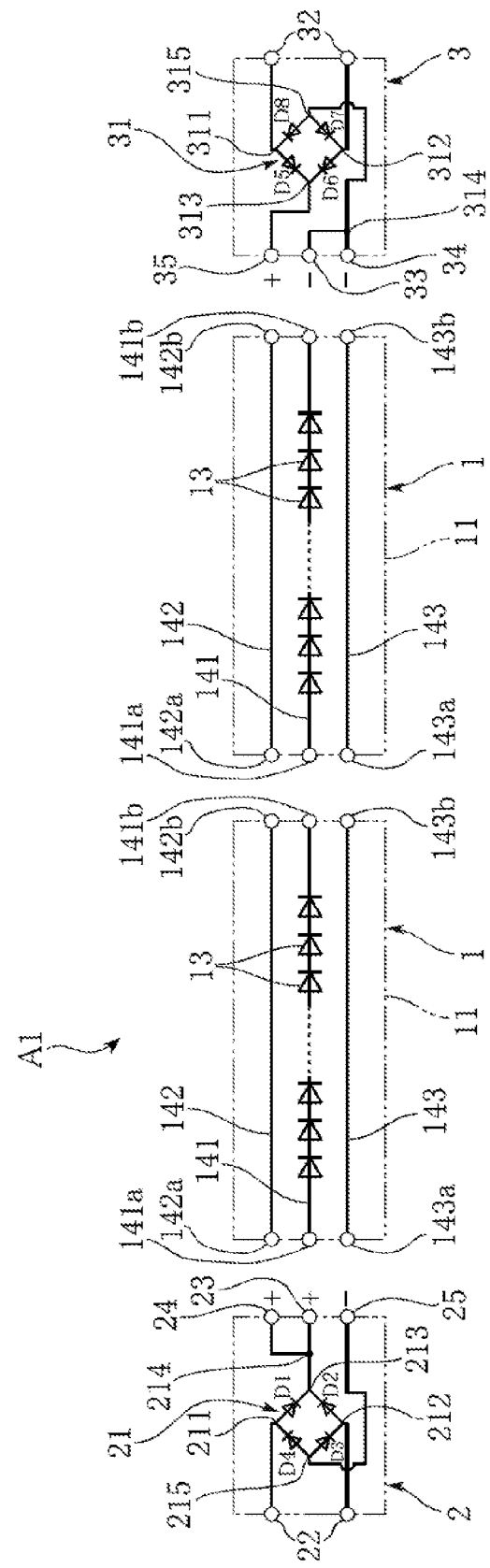
FIG. 2 is a circuit diagram of the LED lamp shown in FIG. 1.

FIGS. 1 and 2 depict an example of a mode in which an LED lamp according to the present invention may be used. The LED lamp A1 according to this embodiment includes two LED units 1 and bases 2 and 3, and may be used as attached to a general-purpose fluorescent illumination instrument as a substitute for e.g. an FL40W type straight-tube fluorescent lamp.

Each of the LED units 1 includes a cylindrical case 12 that accommodates an elongated rectangular-shaped substrate 11. A plurality of LED modules 13 is mounted on the substrate 11. As shown in FIG. 2, on the substrate 11, wirings 141, 142 and 143 are provided so as to extend in the longitudinal direction. The wiring 141 serves to serially connect the plurality of LED modules 13. The function of the wirings 142 and 143 are described later.

Figure 4:
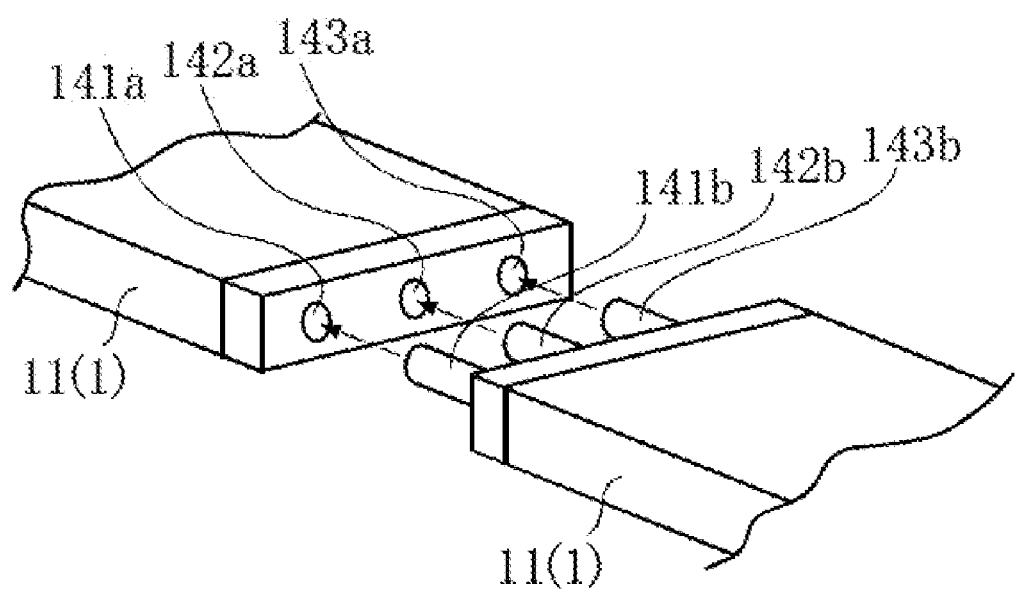
FIG. 4 is a perspective view showing a coupler of the LED lamp according to the present invention.
Figure 5:
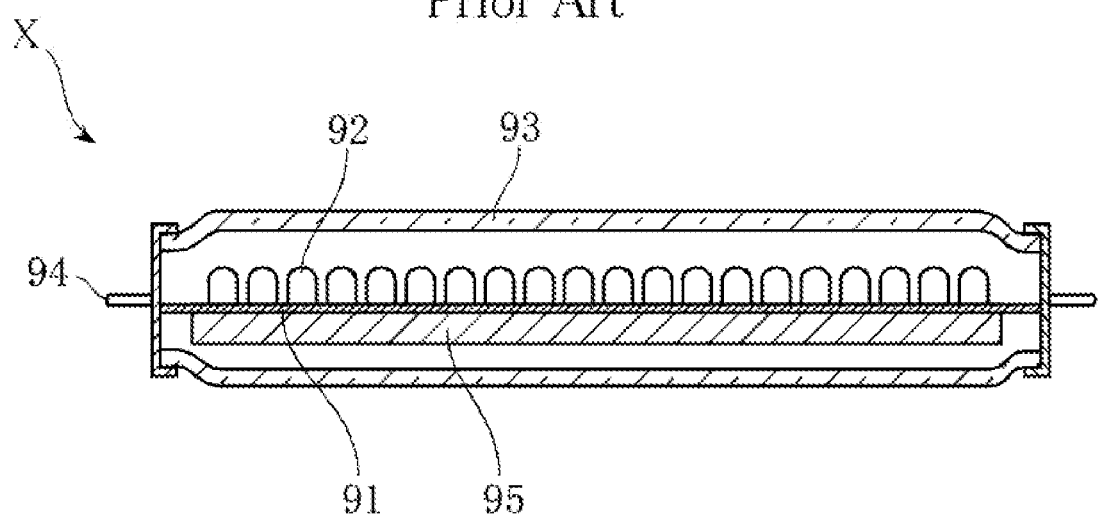
FIG. 5 is a sectional view showing an example of a conventional LED lamp.

The wirings 141, 142 and 143 are respectively provided with terminals 141a and 141b, terminals 142a and 142b, and terminals 143a and 143b at the ends. As shown in FIG. 4, the terminals 141a, 142a and 143a may comprise pin holes, whereas the terminals 141b, 142b and 143b may comprise pins that can be fitted in the terminals 141a, 142a and 143a. This arrangement enables the two LED units 1 to be serially connected to each other. The terminals 141a, 142a, 143a and the terminals 141b, 142b, 143b constitute the coupler according to the present invention. Although this embodiment represents the case where two LED units 1 are employed, it is obvious from the above-described structure that three or more LED units 1, when employed, can be connected in series. To connect two or more LED units 1, a connector (not shown) or the like may be employed as required.

The bases 2 and 3 are the portions to be fitted to the socket of a fluorescent illumination instrument, to thereby supply power from the commercial AC power supply to the LED units 1, and each include a bridge rectifier circuit 21, 31, external connection terminals 22, 32, and electrodes 23 to 25, 33 to 35. The bridge rectifier circuits 21 and 31 are an example of the AC/DC converter according to the present invention, and each include four diodes D1 to D4, and D5 to D8. The external connection terminals 22 and 32 are pins that can be fitted in the inlets of the sockets of a fluorescent illumination instrument. The external connection terminals 22 are electrically connected to a node 211 between the diodes D1 and D4 and to a node 212 between the diodes D2 and D3. The external connection terminals 32 are electrically connected to a node 311 between the diodes D5 and D8 and to a node 312 between the diodes D6 and D7.

The electrodes 23 and 24 of the base 2 are anodes electrically connected to a node 213 between the diodes D1 and D2, and branched in two ways at a node 219. The electrode 25 is a cathode electrically connected to a node 215 between the diodes D3 and D4. The electrode 23, 24 and 25 may comprise pins that can be fitted in the terminals 141a, 142a and 143a of the LED unit 1.

The electrodes 33 and 34 of the base 3 are cathodes electrically connected to a node 315 between the diodes D7 and D8, and branched in two ways at a node 314. The electrode 35 is an anode electrically connected to a node 313 between the diodes D5 and D6. The electrode 33, 34 and 35 may comprise pin holes in which the terminals 141b, 143b and 142b of the LED unit 1 can be fitted.

The terminals 141a, 142a and 143a of the LED unit 1, shown on the left side in FIG. 2, are electrically connected to the electrodes 23, 24 and 25, respectively. Likewise, the terminals 141b, 142b and 143b of the LED unit 1, shown on the right side in the figure, are electrically connected to the electrodes 33, 35, and 34, respectively.

In using the LED lamp A1, an AC voltage is applied to the external connection terminals 22 and 32 at the ends, whereby a full-wave rectified current runs in a forward direction through all the LED modules 13 in the two LED units 1. Specifically, for example, in a positive half period, the current from the AC power supply flows to the two wirings 141 through the external connection terminal 22, the node 211, the diode D1, and the electrode 23, and then to the electrode 33, the nodes 314, 315, the diode D8, the node 311, and the external connection terminal 32. In a negative half period, the current from the AC power supply flows to the two wirings 141 through the external connection terminal 32, the node 311, the diode D5, the electrode 35, the two wirings 142, the electrode 24, the node 214, and the electrode 23, and then to the electrode 33, the node 314, the electrode 34, the two wirings 143, the electrode 25, the node 215, the diode D4, the node 211, and the external connection terminal 22. Thus, the LED modules 13 serially connected to the two wirings 141 constantly emit light.

Figure 3:
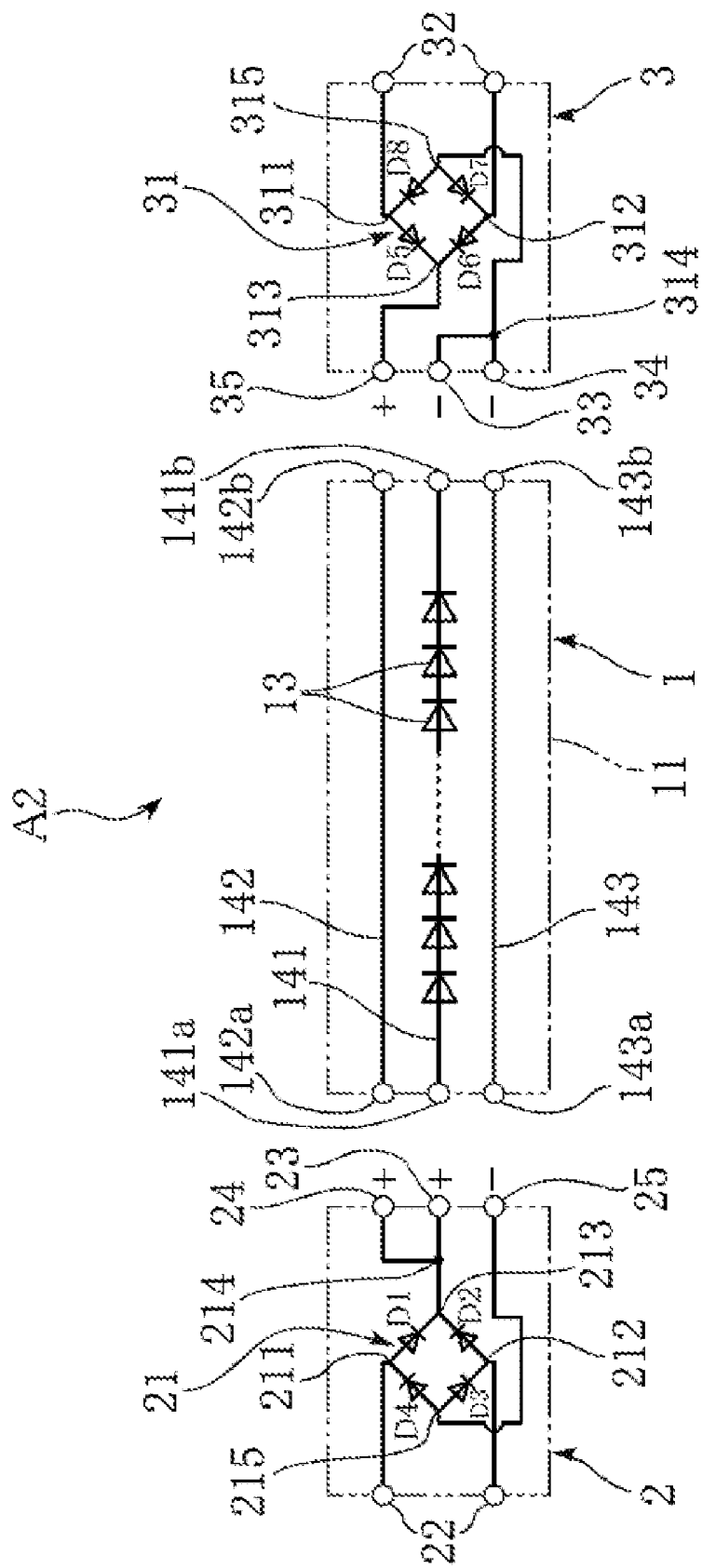
FIG. 3 is a circuit diagram of another example of the LED lamp according to the present invention.

FIG. 3 depicts another example of the mode in which the LED lamp according to the present invention may be used. In FIG. 3, the elements that are identical or similar to those of the foregoing embodiment are given the same reference signs as those used for the foregoing embodiment and the description thereof is appropriately omitted.

The LED lamp A2 shown in FIG. 3 includes a single LED unit 1 and the bases 2 and 3 to be attached to the ends of the LED unit. This LED lamp may be used as attached to a general-purpose fluorescent illumination instrument as a substitute for e.g. an FL20W type straight-tube fluorescent lamp. The LED lamp A2 is different in including the single LED unit 1 from the LED lamp A1 according to the foregoing embodiment, which includes two LED units 1.

In using the LED lamp A2, an AC voltage is applied to the external connection terminals 22 and 32 at the ends, whereby a full-wave rectified current runs in a forward direction through all the LED modules 13 in the LED unit 1. The specific flow of the current is similar to that in the LED lamp A1, and hence the description thereof is omitted.

Advantageous effects of the LED lamps A1 and A2 are described below.

In the LED lamps A1 and A2 according to the foregoing embodiments, a plurality of LED units 1 can be serially connected. Thus, LED lamps of different tube lengths, like the LED lamps A1 and A2, can be produced by changing the number of LED units 1 to be used, i.e., using a single or two or more LED units. That is, the same bases 2, 3 and the same LED unit 1 can be used in common to manufacture two or more types of products of different tube lengths (like the LED lamp A1 and A2), which contributes to reducing the manufacturing cost of the LED lamp A1, A2, and facilitating the management of the products.

With the LED lamp A1, A2 configured as above, whether the LED lamp includes a single LED unit 1 or two LED units 1 connected to each other, a direct current can be supplied through the bridge rectifier circuits 21, 31 in a forward direction to the plurality of LED modules 13 serially connected to each other, simply by inserting the bases 2 and 3 attached to the ends of the LED unit or units 1 into the inlets of the sockets of a general-purpose fluorescent illumination instrument. Accordingly, the LED lamps A1 and A2 configured as above allow all the LED modules 13 to properly emit light, irrespective of the number of the LED units 1 employed therein.

In the case of a straight-tube fluorescent lamp, the stabilizer of a FL20W lamp of a shorter tube length supplies a voltage of 100 V, whereas the stabilizer of a FL40W lamp of a longer tube length supplies 200 V, which is double the voltage of the FL20W lamp. On the other hand, the LED lamp A1, for use as the substitute for the FL40W lamp, includes two LED units 1 which are serially connected. Accordingly, the current supplied to the LED modules 13 of the LED lamp A1 and that supplied to the LED modules 13 of the LED lamp A2 is generally the same, and each of the LED modules 13 can properly emits light.

The LED lamp according to the present invention is not limited to those represented by the foregoing embodiments. Specific structure of the constituents of the LED lamp according to the present invention may be modified in design in various manners.

The LED units do not necessarily need to be provided with respective cases. The LED unit may not be provided with a case, and the LED lamp may instead include a case of a size appropriate for collectively surrounding the plurality of LED units connected to each other.

The invention claimed is:

1. An LED lamp comprising:
    at least one elongated LED unit including a plurality of light emitting diodes; and
    a first and a second bases for receiving power from outside that are configured to be attached to ends of the LED unit in a longitudinal direction,
    wherein the LED unit includes a coupler for allowing serial connection of a plurality of the LED units,
    the LED unit includes a first wiring for serially connecting the light emitting diodes, and a second and a third wirings extending in the longitudinal direction;
    each of the first and the second bases includes an external connection terminal for connection to an AC power supply, a first through a third electrodes that can be electrically connected to the first through the third wirings, respectively, and an AC/DC converter that converts AC to DC, provided between the electrodes and the external connection terminal;
    the first and the second electrodes are anodes while the third electrode is a cathode in the first base;
    the first and the second electrodes are cathodes while the third electrode is an anode in the second base;
    ends of the first wiring are electrically connected to the first electrode of the first base and the first electrode of the second base;
    ends of the second wiring are electrically connected to the second electrode of the first base and the third electrode of the second base; and
    ends of the third wiring are electrically connected to the third electrode of the first base and the second electrode of the second base.

2. The LED lamp according to claim 1, wherein the LED unit includes a cylindrical cover surrounding the plurality of light emitting diodes and is of a straight tube shape as a whole.

3. The LED lamp according to claim 1, wherein:
    the LED unit includes a substrate on which the plurality of light emitting diodes is mounted; and
    the wirings are provided on the substrate.

* * * * *